(12) United States Patent
Olvera et al.

(10) Patent No.: US 11,778,960 B2
(45) Date of Patent: Oct. 10, 2023

(54) BLOWERS

(71) Applicant: TECHTRONIC CORDLESS GP, Anderson, SC (US)

(72) Inventors: Eduardo Olvera, Pendleton, SC (US); V. Praveen Gambhir, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 44 days.

(21) Appl. No.: 17/148,137

(22) Filed: Jan. 13, 2021

(65) Prior Publication Data
US 2021/0219503 A1    Jul. 22, 2021

Related U.S. Application Data

(60) Provisional application No. 62/963,796, filed on Jan. 21, 2020.

(51) Int. Cl.
| | |
|---|---|
| *A01G 20/47* | (2018.01) |
| *A47L 5/14* | (2006.01) |
| *A47L 9/28* | (2006.01) |
| *A47L 9/32* | (2006.01) |

(52) U.S. Cl.
CPC ............ *A01G 20/47* (2018.02); *A47L 5/14* (2013.01); *A47L 9/2842* (2013.01); *A47L 9/322* (2013.01)

(58) Field of Classification Search
CPC .......... A47L 5/14; A47L 9/322; A47L 9/2842; A01G 20/43; A01G 20/47
USPC ......................................................... 15/405
See application file for complete search history.

(56) References Cited

U.S. PATENT DOCUMENTS

| | | | |
|---|---|---|---|
| 3,308,608 | A | 3/1967 | Torsten |
| 4,120,616 | A | 10/1978 | Dwyer et al. |
| 4,269,571 | A | 5/1981 | Shikutani et al. |
| 4,318,203 | A | 3/1982 | Satoh et al. |
| 4,596,921 | A | 6/1986 | Hersh et al. |

(Continued)

FOREIGN PATENT DOCUMENTS

| | | |
|---|---|---|
| AU | 2012101710 A4 | 1/2013 |
| CA | 2934320 C | 8/2017 |

(Continued)

OTHER PUBLICATIONS

Canadian Office Action corresponding to Application No. 3,106,211 dated Apr. 11, 2022 (1 page).

*Primary Examiner* — David Redding
*Assistant Examiner* — Tyler James McFarland
(74) *Attorney, Agent, or Firm* — Dority & Manning, P.A.

(57) ABSTRACT

A blower including a body having a length, L, as measured between front and rear ends of the blower in a direction of airflow through the blower; and a fan including a plurality of blades configured to generate airflow through the blower, wherein the blades are spaced apart from the rear end of the blower by at least 0.4 L. In an embodiment, the fan is rotatably biased by a motor spaced apart from the rear end of the blower by at least 0.5 L. In another embodiment, at least 75% of the fan is disposed within an airflow outlet tube of the blower. In yet another embodiment, the blower further comprises a handle, and wherein the fan is disposed downstream of the handle, and wherein the fan is spaced apart from the handle by at least 0.08 L, as measured in the direction of airflow.

20 Claims, 5 Drawing Sheets

(56) References Cited

U.S. PATENT DOCUMENTS

| | | |
|---|---|---|
| 4,674,146 A | 6/1987 | Tuggle et al. |
| 4,884,314 A | 12/1989 | Miner et al. |
| 5,011,058 A | 4/1991 | Sapp et al. |
| 5,052,073 A | 10/1991 | Iida |
| 5,195,208 A | 3/1993 | Yamami et al. |
| 5,211,144 A | 5/1993 | Collins et al. |
| 5,269,665 A | 12/1993 | Sadler et al. |
| 5,361,738 A | 11/1994 | Iida |
| 5,457,846 A | 10/1995 | Kuwano et al. |
| 5,821,473 A | 10/1998 | Takahashi |
| 5,841,080 A | 11/1998 | Iida et al. |
| 5,857,439 A | 1/1999 | Will et al. |
| 5,926,910 A | 7/1999 | Nishimura et al. |
| 5,975,862 A | 11/1999 | Arahata et al. |
| 5,979,013 A | 11/1999 | Beckey et al. |
| 6,004,093 A | 12/1999 | Ishikawa |
| 6,077,033 A | 6/2000 | Ishikawa |
| 6,105,205 A | 8/2000 | Takahashi et al. |
| 6,105,206 A | 8/2000 | Tokumaru et al. |
| 6,109,865 A | 8/2000 | Ishikawa |
| 6,158,082 A | 12/2000 | Beckey et al. |
| 6,305,048 B1 | 10/2001 | Salisian |
| 6,324,721 B2 | 12/2001 | D?ragrip |
| 6,370,729 B2 | 4/2002 | Miyamoto |
| 6,468,053 B2 | 10/2002 | W?lpert |
| 6,511,286 B2 | 1/2003 | Miyamoto |
| 6,514,036 B2 | 2/2003 | Marshall et al. |
| 6,575,695 B1 | 6/2003 | Miyamoto |
| 6,637,069 B2 | 10/2003 | Marshall et al. |
| 6,736,610 B2 | 5/2004 | Cifarelli |
| 6,755,278 B2 | 6/2004 | Huhn et al. |
| 6,857,163 B2 | 2/2005 | Iida et al. |
| 7,055,213 B2 | 6/2006 | Iida et al. |
| 7,159,691 B2 | 1/2007 | Dahlberg et al. |
| 7,185,393 B2 | 3/2007 | Dahlberg et al. |
| 7,293,629 B2 | 11/2007 | Nasuno et al. |
| 7,300,243 B2 | 11/2007 | Saitou et al. |
| 7,309,028 B2 | 12/2007 | Langhans et al. |
| 7,543,725 B2 | 6/2009 | Herzog |
| 7,698,779 B2 | 4/2010 | Schliemann et al. |
| 7,721,384 B2 | 5/2010 | Crevling, Jr. |
| 7,744,342 B2 | 6/2010 | Kamoshita et al. |
| 7,774,896 B2 | 8/2010 | Andresen et al. |
| 7,975,652 B2 | 7/2011 | Denison et al. |
| 7,979,958 B2 | 7/2011 | Raffenberg |
| 8,032,977 B2 | 10/2011 | Coombs |
| 8,032,980 B2 | 10/2011 | Basenberg, Jr. et al. |
| 8,251,644 B2 | 8/2012 | Wada et al. |
| 8,256,132 B2 | 9/2012 | Gaillard et al. |
| 8,337,145 B2 | 12/2012 | Frater et al. |
| 8,397,344 B2 | 3/2013 | Liddell |
| 8,539,637 B2 | 9/2013 | Basenberg, Jr. et al. |
| 8,671,508 B2 | 3/2014 | Nagasaka et al. |
| 8,745,815 B2 | 6/2014 | Takano et al. |
| 8,756,754 B2 | 6/2014 | Allen et al. |
| 8,789,237 B2 | 7/2014 | Hatano et al. |
| 8,893,400 B2 | 11/2014 | Carme |
| 9,004,854 B2 | 4/2015 | Nakazawa |
| 9,364,125 B2 | 6/2016 | Takahashi |
| 9,538,711 B2 | 1/2017 | Mutoh et al. |
| 9,848,745 B2 | 12/2017 | Hill et al. |
| 9,850,915 B2 | 12/2017 | Takano |
| 9,975,235 B2 | 5/2018 | Notaras et al. |
| 9,980,549 B2 | 5/2018 | Sakuma et al. |
| 10,117,491 B2 | 11/2018 | Moloney et al. |
| 10,219,664 B2 | 3/2019 | Lauer |
| 2002/0060107 A1 | 5/2002 | Kamoshita et al. |
| 2003/0039541 A1 | 2/2003 | Wargo |
| 2006/0196075 A1 | 9/2006 | Santhouse et al. |
| 2007/0174992 A1 | 8/2007 | Murray et al. |
| 2007/0294855 A1 | 12/2007 | Iida et al. |
| 2009/0038106 A1 | 2/2009 | Wada et al. |
| 2009/0271945 A1 | 11/2009 | Ludwigson |
| 2010/0000053 A1 | 1/2010 | Moriya et al. |
| 2010/0064542 A1 | 3/2010 | Mulvaney et al. |
| 2011/0146023 A1 | 6/2011 | Wada et al. |
| 2011/0200426 A1 | 8/2011 | Takano |
| 2013/0061419 A1 | 3/2013 | Patrono et al. |
| 2013/0183141 A1 | 7/2013 | Tan |
| 2014/0050600 A1 | 2/2014 | Kodato et al. |
| 2014/0154106 A1 | 6/2014 | Notaras et al. |
| 2014/0230181 A1* | 8/2014 | Yamaoka ............... A01G 20/47 15/344 |
| 2014/0290087 A1 | 10/2014 | Weatherly |
| 2014/0328670 A1 | 11/2014 | Lamb |
| 2015/0201730 A1 | 7/2015 | Carlucci et al. |
| 2015/0211535 A1* | 7/2015 | Kodato ............... F04D 29/5806 417/371 |
| 2015/0377253 A1 | 12/2015 | Shibata et al. |
| 2016/0014973 A1 | 1/2016 | Thackery et al. |
| 2016/0169249 A1* | 6/2016 | Takahashi ........... F04D 25/0673 417/423.14 |
| 2016/0235178 A1 | 8/2016 | Atkinson et al. |
| 2016/0238033 A1 | 8/2016 | Fang et al. |
| 2016/0298635 A1 | 10/2016 | Su et al. |
| 2016/0305438 A1 | 10/2016 | Yamamoto et al. |
| 2016/0330913 A1 | 11/2016 | Shao et al. |
| 2017/0045058 A1* | 2/2017 | Bylund ................ F04D 25/084 |
| 2017/0114801 A1 | 4/2017 | Duquette |
| 2018/0000014 A1 | 1/2018 | Yamaoka et al. |
| 2018/0094393 A1 | 4/2018 | Takahashi et al. |
| 2018/0146628 A1 | 5/2018 | Huo et al. |
| 2018/0163750 A1 | 6/2018 | Landén |
| 2018/0291930 A1 | 10/2018 | Pellenc |
| 2019/0021243 A1 | 1/2019 | Naka et al. |
| 2019/0069737 A1 | 3/2019 | Sakuma et al. |
| 2019/0069741 A1 | 3/2019 | Murakami et al. |
| 2019/0069742 A1 | 3/2019 | Sakuma et al. |

FOREIGN PATENT DOCUMENTS

| | | |
|---|---|---|
| CN | 1253614 A | 5/2000 |
| CN | 201822166 U | 5/2011 |
| CN | 202157288 U | 3/2012 |
| CN | 202228435 U | 5/2012 |
| CN | 102525336 A | 7/2012 |
| CN | 202386031 U | 8/2012 |
| CN | 202626912 U | 12/2012 |
| CN | 102852107 A | 1/2013 |
| CN | 202688933 | 1/2013 |
| CN | 203475365 | 3/2014 |
| CN | 203514240 U | 4/2014 |
| CN | 103775384 A | 5/2014 |
| CN | 104207454 A | 12/2014 |
| CN | 104343746 A | 2/2015 |
| CN | 104420432 A | 3/2015 |
| CN | 102296555 B | 5/2015 |
| CN | 102482856 B | 7/2015 |
| CN | 104919973 A | 9/2015 |
| CN | 204617367 U | 9/2015 |
| CN | 105248156 A | 1/2016 |
| CN | 204969959 U | 1/2016 |
| CN | 205154642 U | 4/2016 |
| CN | 205306234 U | 6/2016 |
| CN | 205378984 | 7/2016 |
| CN | 105816101 A | 8/2016 |
| CN | 105816104 A | 8/2016 |
| CN | 205639097 U | 10/2016 |
| CN | 205776021 U | 12/2016 |
| CN | 106436628 A | 2/2017 |
| CN | 106436629 A | 2/2017 |
| CN | 106510169 A | 3/2017 |
| CN | 106618381 A | 5/2017 |
| CN | 206183166 U | 5/2017 |
| CN | 106821142 A | 6/2017 |
| CN | 105297659 B | 7/2017 |
| CN | 206418446 U | 8/2017 |
| CN | 105297660 B | 9/2017 |
| CN | 107198492 A | 9/2017 |
| CN | 206482185 U | 9/2017 |
| CN | 107268501 A | 10/2017 |
| CN | 107269550 A | 10/2017 |
| CN | 107303065 A | 10/2017 |
| CN | 107373988 A | 11/2017 |

(56) References Cited

FOREIGN PATENT DOCUMENTS

| | | |
|---|---|---|
| CN | 206651502 U | 11/2017 |
| CN | 105274952 B | 12/2017 |
| CN | 107455900 A | 12/2017 |
| CN | 206736818 U | 12/2017 |
| CN | 206801962 U | 12/2017 |
| CN | 207049045 U | 2/2018 |
| CN | 107761632 A | 3/2018 |
| CN | 107772736 A | 3/2018 |
| CN | 107898100 A | 4/2018 |
| CN | 107996121 A | 5/2018 |
| CN | 108029324 A | 5/2018 |
| CN | 108055908 A | 5/2018 |
| CN | 207306313 U | 5/2018 |
| CN | 207393415 U | 5/2018 |
| CN | 207520088 U | 6/2018 |
| CN | 108260912 A | 7/2018 |
| CN | 106677105 B | 8/2018 |
| CN | 107201734 B | 8/2018 |
| CN | 108378518 A | 8/2018 |
| CN | 107288084 B | 9/2018 |
| CN | 108476871 | 9/2018 |
| CN | 207919464 U | 9/2018 |
| CN | 104983168 B | 11/2018 |
| CN | 108741566 A | 11/2018 |
| CN | 108742297 A | 11/2018 |
| CN | 108797483 A | 11/2018 |
| CN | 208081679 U | 11/2018 |
| CN | 109123983 A | 1/2019 |
| CN | 109371888 A * | 2/2019 ........... E01H 1/0809 |
| CN | 109371888 A | 2/2019 |
| CN | 109372801 A | 2/2019 |
| CN | 208462684 U | 2/2019 |
| CN | 208524019 U | 2/2019 |
| CN | 208577990 U | 3/2019 |
| CN | 208577992 U | 3/2019 |
| EP | 1355064 B1 | 3/2005 |
| JP | 06242758 B2 | 1/2016 |
| WO | 1997041631 A1 | 11/1997 |
| WO | 2014001496 A1 | 1/2014 |
| WO | 2015005140 A1 | 1/2015 |
| WO | 2015150720 A1 | 10/2015 |
| WO | 2017060003 A1 | 4/2017 |
| WO | 2017109360 A1 | 6/2017 |
| WO | 2017181484 A1 | 10/2017 |
| WO | 2018164145 A1 | 9/2018 |

\* cited by examiner

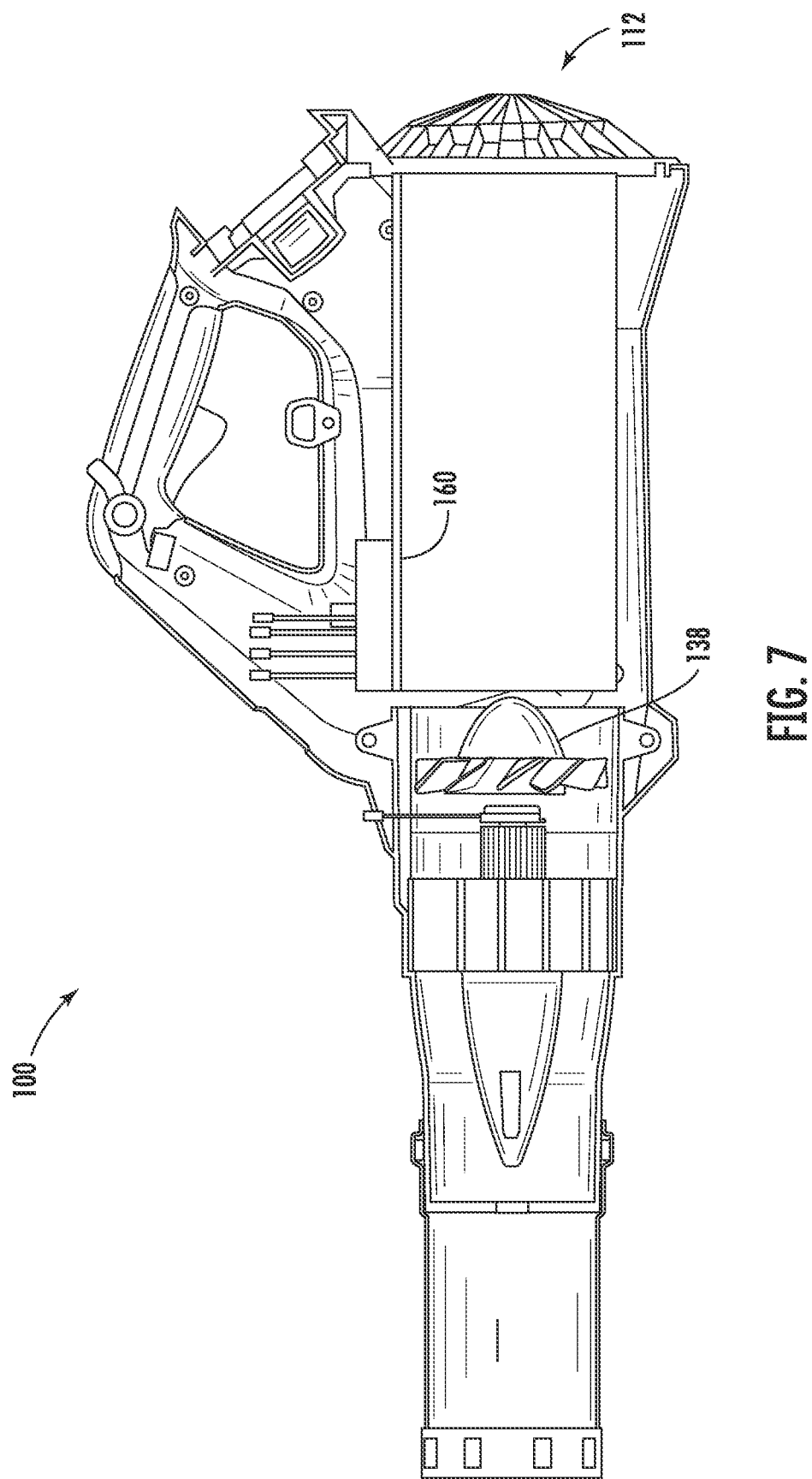

BLOWERS

This application claims the benefit of priority to U.S. Provisional Patent Application No. 62/963,796, filed on Jan. 21, 2020, the disclosure of which is incorporated by reference herein in its entirety.

FIELD

The present disclosure relates generally to blowers, and more particularly to blowers with improved structural configurations.

BACKGROUND

Blowers are typically utilized in outdoor activities, such as lawn maintenance and garden work. Blowers generally include an air biasing element that drives airflow through an exhaust port to generate directional force. By pointing the airflow from the exhaust port at a target object, an operator can bias the object in a desired direction. For lawn maintenance, for example, this may include targeting leaves and other debris with directional airflow to move the leaves and clean the ground surface.

Traditionally, blowers were designed with minimal attention to the orientation and placement of components relative to one another. As such, it was not uncommon to have blowers with eccentric weight distributions that required unnecessary force from an operator to properly maintain balance of the blower to keep the exhaust port pointing in the desired direction.

Accordingly, a blower having improved design features is desired in order to reduce wasted operator effort and create a better user experience.

BRIEF DESCRIPTION

Aspects and advantages of the invention will be set forth in part in the following description, or may be obvious from the description, or may be learned through practice of the invention.

In accordance with one aspect, the present disclosure is directed to a blower having a body with a length, L, as measured between front and rear ends of the blower in a direction of airflow through the blower. The blower also includes a fan having a plurality of blades configured to generate airflow through the blower. The blades are spaced apart from the rear end of the blower by at least 0.4 L. In an embodiment, the fan can be rotatably biased by a motor spaced apart from the rear end of the blower by a distance greater than the fan, such as by at least 0.5 L. In one or more embodiments, at least 75% of the fan can be disposed within an airflow outlet tube of the blower. In such a manner, the fan can be disposed closer to an exhaust port of the blower and farther from the rear end of the blower.

In accordance with another aspect, the present disclosure is directed to a blower including a fan, a body having a rear end defined by an air inlet and a handle disposed between the air inlet and the fan, and a battery port disposed between the air inlet and the handle. The battery port can include a battery interface that defines a plane, or best fit plane, disposed at an angular orientation between 35° and 55°, as measured with respect to a direction of airflow through the blower. In an embodiment, the plane, or best fit plane, can be disposed at an angular orientation of approximately 45°, as measured with respect to the direction of airflow. In another embodiment, the plane, or best fit plane, intersects a longitudinal axis of airflow through the blower at an intersecting location. The rear end of the blower can be disposed between a front end of the blower and the intersecting location. In another embodiment, an entire shadow of the battery port can intersect a longitudinal axis of airflow through the blower at a location between the rear end of the blower and the fan. In another embodiment, the fan is disposed downstream of the handle and spaced apart from the handle by at least 0.08 L, as measured in the direction of airflow. In an embodiment, the air inlet is coaxial with the direction of airflow through the blower.

In accordance with another aspect, the present disclosure is directed to a blower including a fan, an air inlet defining a rear end of the blower, a handle, and a battery port disposed between the air inlet and the handle. The batter port includes a battery interface configured to receive a battery. The battery interface defines a plane, or best fit plane, disposed at an angular orientation between 35° and 55°, as measured with respect to a direction of airflow through the blower. In an embodiment, the plane, or best fit plane, intersects a longitudinal axis of airflow through the blower at an intersecting location. The rear end of the blower can be disposed between a front end of the blower and the intersecting location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 7 includes a cross-sectional side view of a blower in accordance with an embodiment of the present disclosure.

DETAILED DESCRIPTION

Figure 1:
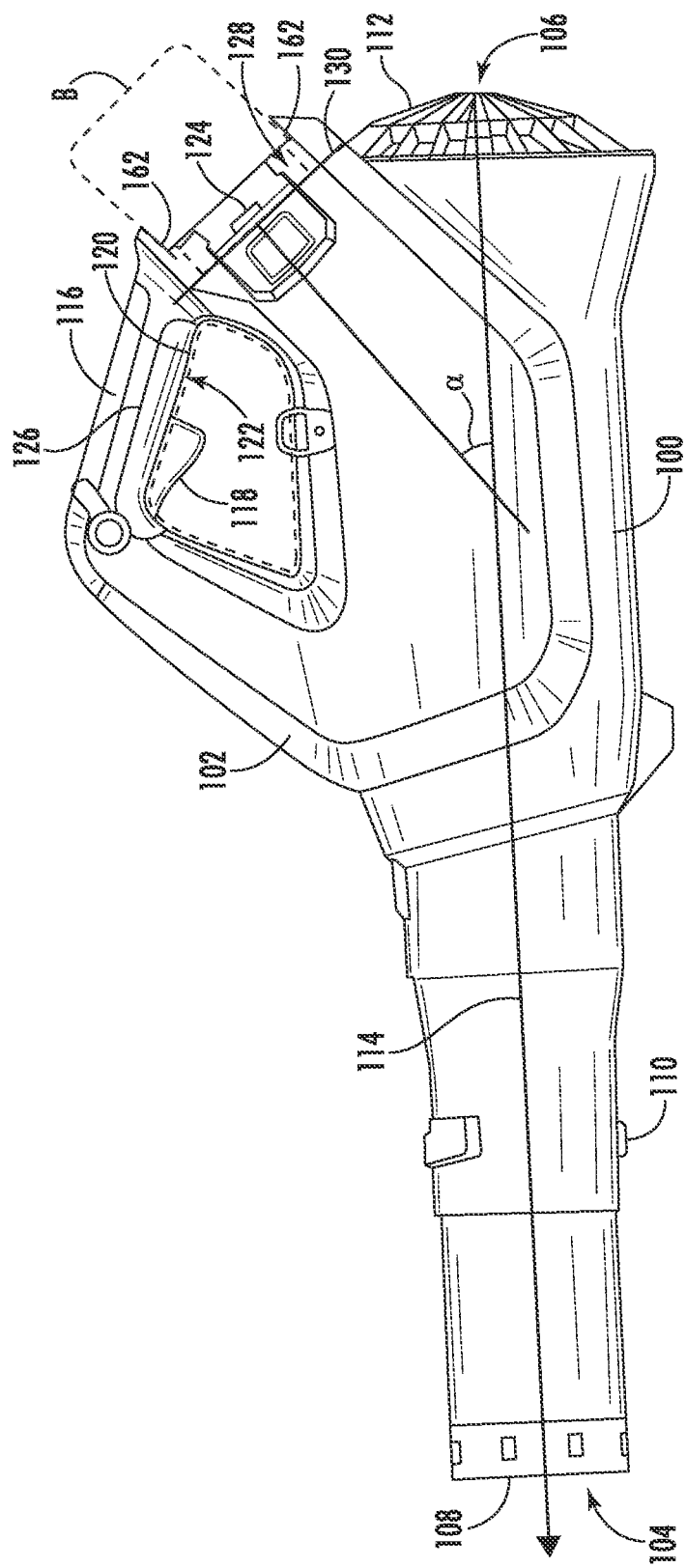
FIG. 1 includes a side view of a blower in accordance with an embodiment of the present disclosure.

Reference now will be made in detail to embodiments of the invention, one or more examples of which are illustrated in the drawings. Repeat use of reference characters in the present specification and drawings is intended to represent the same or analogous features or elements of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and do not necessarily signify sequence or importance of the individual components. As used herein, terms of approximation, such as "generally," "substantially," "approximately," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the Figures, the present disclosure is generally directed to a blower. The blower can be a gas blower or an electric blower including a battery and/or corded connection. In one or more embodiments, reference made herein with respect to a battery and battery port should be understood as alternatively including a gas-powered engine or a corded connection interface.

FIG. 1 illustrates an exemplary blower 100 in accordance with an embodiment described herein. The blower 100 includes a body 102 having one or more parts extending between a front end 104 and a rear end 106. The front end 104 can be defined at least in part by an exhaust port 108 of an airflow outlet tube 110 of the blower 100. The airflow outlet tube 110 may be selectively detachable from a second portion of the body 102, such as a main housing of the body 102. In an embodiment, the airflow outlet tube 110 may be interchangeable with airflow outlet tubes having different specifications and/or characteristics, e.g., different exhaust port shapes, different lengths, and/or different diameters. In an embodiment, the airflow outlet tube 110 can include two or more segments, each segment being selectively detachable and/or interchangeable.

The rear end 106 of the blower 100 can be at least partially defined by an air inlet 112, including, for example, a grate or cover through which airflow into the blower 100 can be received. In an embodiment, the grate or cover of the air inlet 112 can have a conical or frustoconical shape extending toward the rear end 106 of the blower 100. In another embodiment, the grate or cover of the air inlet 112 can have a generally planar shape. In an embodiment, the grate or cover of the air inlet 112, or a best fit plane associated therewith, can be substantially parallel with a plane defined by the exhaust port 108.

In an embodiment, the blower 100 can define an axis 114 corresponding with a direction of airflow through the blower 110. The axis 114 can extend from the air inlet 112 toward the exhaust port 108. In an embodiment, the air inlet 112 and exhaust port 108 can be coaxial with one another along the axis 114. For example, in an embodiment, the angular orientations of the air inlet 112, or a best fit plane associated therewith, can be parallel, or substantially parallel, with the exhaust port 108, or a best fit plane associated therewith. In another embodiment, the exhaust port 108 can be angularly offset from the axis 114. That is, for example, the exhaust port 108 can be oriented along a plane, or a best fit plane, angularly offset from perpendicular with respect to the axis 114. In yet a further embodiment, the air inlet 112, or a best fit plane associated therewith, can be oriented at an angle perpendicular, or substantially perpendicular, to the axis 114.

The blower 100 can further include a handle 116 with a trigger 118 for controlling volumetric airflow of the blower 100. The handle 116 can include a gripping surface 122 where an operator can hold the blower 100 during normal operation thereof. In certain instances described hereinafter, reference made with respect to the handle 116 may include the entirety of an opening 120 associated with the gripping surface 122 of the handle 116. That is, in certain embodiments reference to the handle 116 may include other surfaces defined by the opening 120 in addition to the gripping surface 122. The gripping surface 122 can have a sloped profile tapering toward the rear end 106 of the blower 100.

Figure 2:
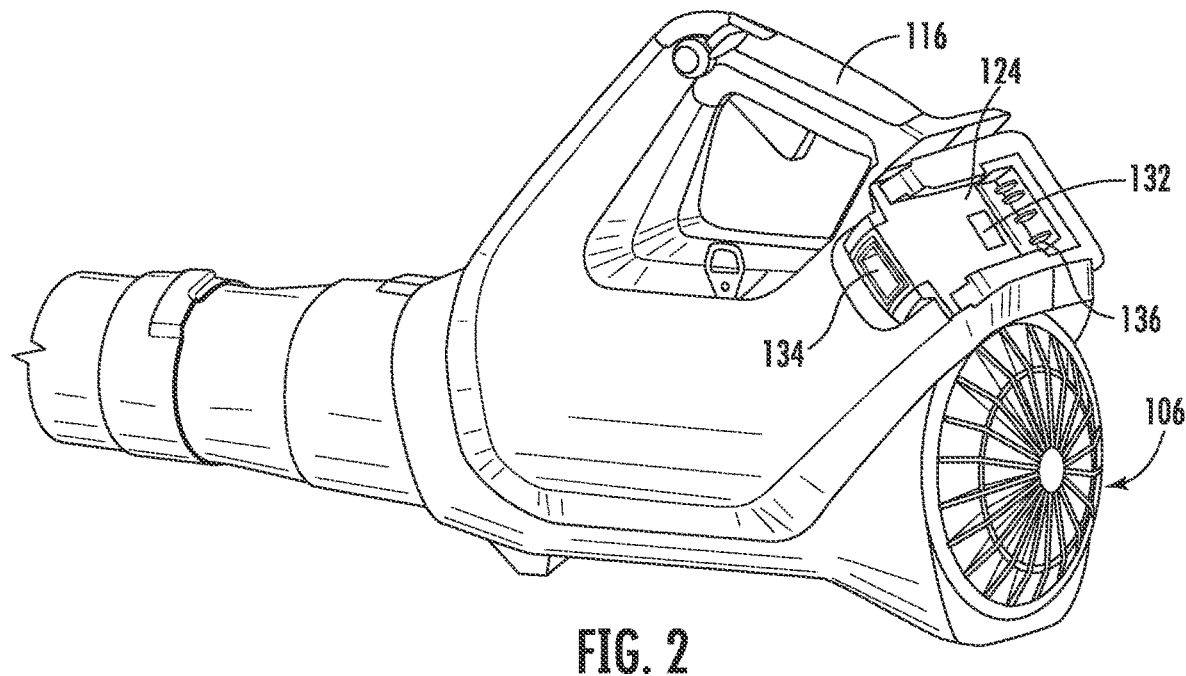
FIG. 2 includes a rear perspective view of a blower in accordance with an embodiment of the present disclosure.

A battery port 124 of the blower 100 can be configured to selectively receive a battery B. The battery B can be selectively attachable with the battery port 124 through translation, rotation, another suitable movement, or any combination thereof. In an embodiment, the battery B may be removably coupled with the battery port 124 via one or more selective retaining members 132 (FIG. 2). An operator can affect release of the battery B by adjusting a position or orientation of the one or more selective retaining members 132 and removing the battery B from the battery port 124.

In an embodiment, the battery port 124 may be disposed between the rear end 106 of the blower 100 and the handle 116. In a more particular embodiment, the battery port 124 may be disposed between the air inlet 112 and the handle 116. In one or more embodiments, the battery port 124 can be approximately equally spaced apart from the rear end 106 of the blower 100 and a generally center location 126 of the gripping surface 122 of the handle 116.

The battery port 124 may define a battery interface 128 configured to mate against a surface of the battery B when the battery B is engaged with the battery port 124. The battery interface 128 may define an operational area of contact between the battery and the battery port 124. In certain instances, the battery interface 128 may comprise one surface of the battery port 124. That is, for example, the interface between the battery B and the battery port 124 may occur primarily along a single surface. FIG. 1 illustrates a battery port 124 with a single surface defining the battery interface 128. Side walls 162 act primarily as guides and alignment features when coupling the battery B with the battery port 124. In non-illustrated embodiments, the battery interface 128 may include a plurality of surfaces of the battery port 124. For example, the interface between the battery B and the battery port 124 may occur along two or more surfaces of the battery port 124 which collectively interface with the battery B to couple the battery B to the battery port 124.

In an embodiment, the battery interface 128 can lie along a plane 130, or a best fit plane (referred to collectively as the plane 130), disposed at an angle, a, angularly offset from the axis 114 of the blower 100. By way of example, the plane 130 can be angularly offset from the axis 114 by an angle, a, of at least 1°, such as at least 2°, such as at least 3°, such as at least 4°, such as at least 5°, such as at least 10°, such as at least 20°, such as at least 30°, such as at least 40°. In another embodiment, the plane 130 can be angularly offset from the axis 114 by an angle, a, no greater than 89°, such as no greater than 70°, such as no greater than 60°. In an embodiment, the plane 130 can be angularly offset from the axis 114 by an angle, a, in a range of 1° and 89°, such as 10° and 80°, such as 30° and 60°, such as 35° and 55°, such as 40° and 50°. In a particular embodiment, the plane 130 can be angularly offset from the axis 114 by approximately 45°. The plane 130 can intersect the axis 114 of the blower 100 at an intersecting location. The rear end 106 of the blower can be disposed between the front end 104 of the blower 100 and the intersecting location. That is, the plane 130 can intersect the axis 114 at a location behind the rear end 106 of the blower 100.

The battery port 124 may lie between the front and rear ends 104 and 106 of the blower 100, as measured along the axis 114 in the direction of airflow through the blower 100. In an embodiment, the entire battery port 124 may lie between the front and rear ends 104 and 106 of the blower, as measured along the axis 114 in the direction of airflow through the blower 100. When positioned in the battery port 124, the battery B, or a portion thereof, can extend past from the battery port 124 to a location behind the rear end 106 of the blower 100. Thus, when the battery B is connected to the battery port 124, the rearmost end of the blower 100 can be defined by the battery B.

FIG. 2 illustrates a rear perspective view of the blower 100 in accordance with an embodiment. The battery port 124 includes one or more selective retaining members 132 configured to engage the battery B. In an embodiment, the one or more selective retaining members 132 can be selectively moved to an open position, whereby the battery B can be removed from the battery port 124, by engaging a release 134. In an embodiment, the release 134 may be moveable in a direction along a line extending parallel with the plane 130 of the battery interface 128. The release 134 may be spring loaded to return to an undepressed position when application of force is terminated. Upon releasing the one or more selective retaining members 132, the battery B can be removed from the battery port 124 in a lateral direction. Rails, channels or other guiding members may be contained in the battery port 124 to guide the battery B in and out of the battery port 124 to prevent damage to electrical connectors 136 of the battery port 124. In the illustrated embodiment, the battery B is insertable into the battery port 124 through a lateral side of the battery port 124. In another embodiment, the battery B can be inserted into the battery port 124 through an axial end of the battery port 124, such as from an end of the battery port 124 closer to the handle 116 or an end of the battery port 124 closer to the rear end 106 of the blower 100.

Figure 3:
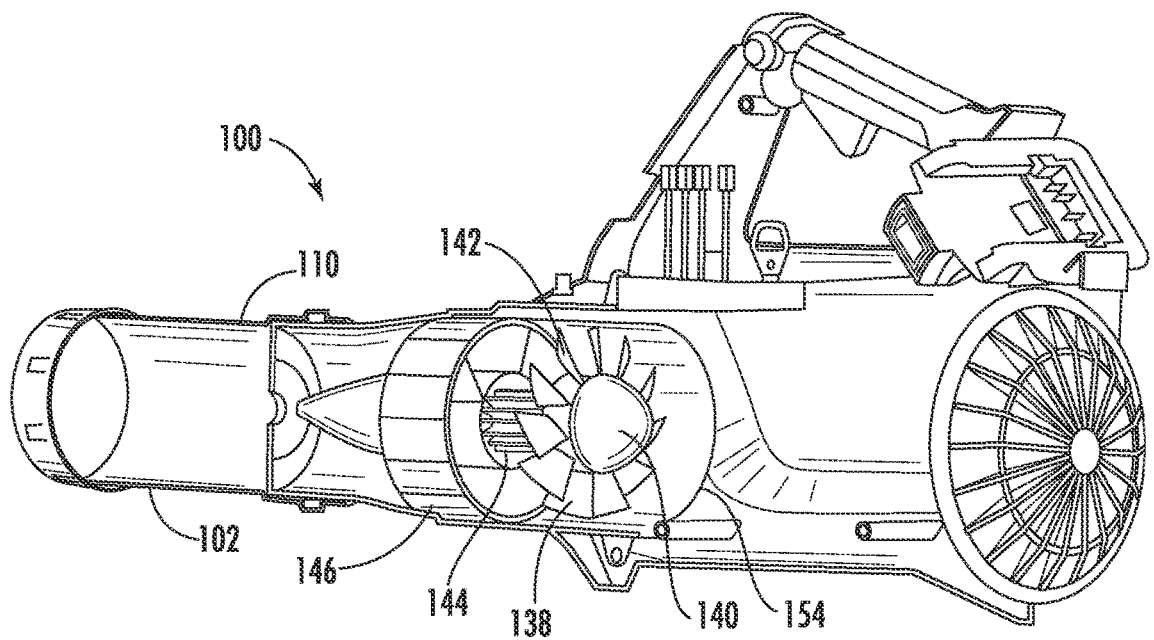
FIG. 3 includes a cross-sectional rear perspective view of a blower in accordance with an embodiment of the present disclosure.
Figure 4:
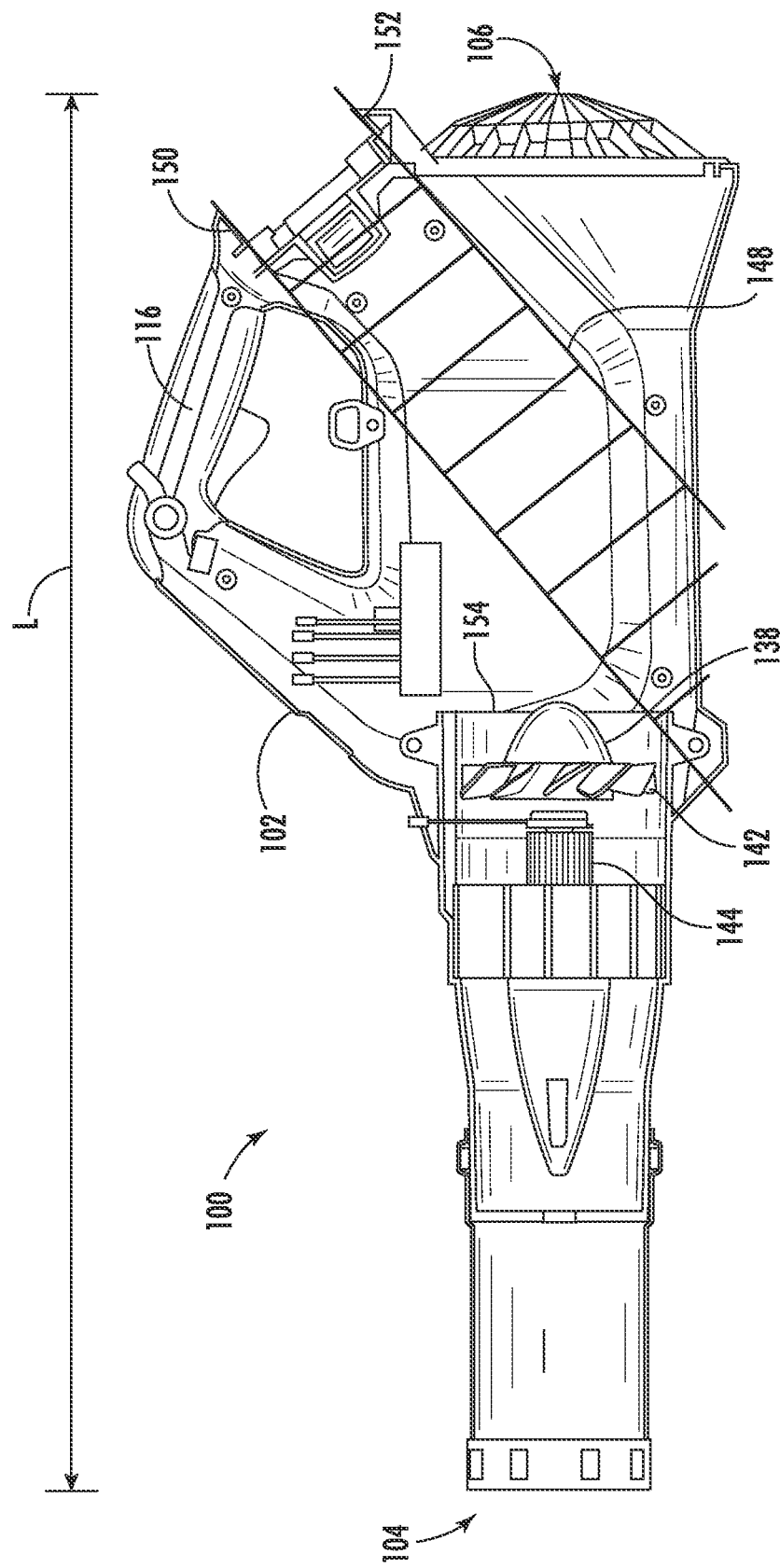
FIG. 4 includes a cross-sectional side view of a blower in accordance with an embodiment of the present disclosure.

FIG. 3 illustrates a partial cross-sectional view of the blower 100 with the body 102 partially removed. The blower 100 can include a biasing element, such as a fan 138 configured to generate airflow through the blower 100. The fan 138 can be disposed at least partially within the airflow outlet tube 110 of the blower 100. For example, in an embodiment, at least 5% of the fan 138 can be disposed within the airflow outlet tube 110, such as at least 10% of the fan 138 can be disposed within the airflow outlet tube 110, such as at least 15% of the fan 138 can be disposed within the airflow outlet tube 110, such as at least 20% of the fan 138 can be disposed within the airflow outlet tube 110, such as at least 25% of the fan 138 can be disposed within the airflow outlet tube 110, such as at least 30% of the fan 138 can be disposed within the airflow outlet tube 110, such as at least 40% of the fan 138 can be disposed within the airflow outlet tube 110, such as at least 50% of the fan 138 can be disposed within the airflow outlet tube 110, such as at least 60% of the fan 138 can be disposed within the airflow outlet tube 110, such as at least 70% of the fan 138 can be disposed within the airflow outlet tube 110, such as at least 75% of the fan 138 can be disposed within the airflow outlet tube 110, such as at least 80% of the fan 138 can be disposed within the airflow outlet tube 110, such as at least 90% of the fan 138 can be disposed within the airflow outlet tube 110, such as at least 95% of the fan 138 can be disposed within the airflow outlet tube 110. In one or more embodiments, the entire fan 138 can be disposed within the airflow outlet tube 110. The fan 138 can be attached to the airflow outlet tube 110 or another part of the body 102 of the blower 100. It is noted that the airflow outlet tube 110 may include multiple components. FIGS. 3 and 4 illustrate an exemplary interior endpoint 154 of the airflow outlet tube 110, however, in other embodiments, the airflow outlet tube 110 may extend more or less towards the rear end 106 of the blower 100.

In an embodiment, the fan 138 includes a rotatable hub 140 and a plurality of blades 142 extending radially outward from the hub 140. The hub 140 can have a conical shape, a frustoconical shape, a half-dome shape, another tapered profile, or any combination thereof. The plurality of blades 142 can extend outward from the hub 140 toward the airflow outlet tube 110.

The fan 138 can be rotatably biased by a motor 144 so as to create airflow within the blower 100. The motor 144 can be disposed on a downstream side of the fan 138. That is, the motor 144 can be disposed closer to the front end 104 of the blower than the fan 138. In an embodiment, a stator 146 can be disposed on a downstream side of the fan 138. The stator 146 can be fixed with respect to the airflow outlet tube 110. The stator 146 can reduce airflow swirl at the exhaust port 108, creating a more desirable exhaust airflow pattern.

FIG. 4 illustrates a cross-sectional side view of the blower 100. As illustrated, the blower 100 can have a length, L, as measured between the rear end 106 and front end 104 of the body 102. In an embodiment, at least a portion of the fan 138 can be spaced apart from the rear end 106 of the blower 100 by at least 0.4 L, such as by at least 0.45 L, such as by at least 0.5 L, such as by at least 0.55 L, such as by at least 0.6 L, such as by at least 0.65 L, such as by at least 0.7 L, such as by at least 0.75 L. In a more particular embodiment, the blades 142 of the fan 138 can be spaced apart from the rear end 106 of the blower 100 by at least 0.4 L, such as by at least 0.45 L, such as by at least 0.5 L, such as by at least 0.55 L, such as by at least 0.6 L, such as by at least 0.65 L, such as by at least 0.7 L, such as by at least 0.75 L. By way of a non-limiting example, if the blower 100 has a length, L, of approximately 48 inches, the blades 142 can be spaced apart from the rear end 106 of the blower 100 by at least approximately 19.2 inches (i.e., at least 0.4 L). In an embodiment, the fan 138, or more particularly the blades 142 associated therewith, can be disposed at a generally center point of the length, L, of the blower 100, i.e., approximately 0.5 L. Placement of the fan 138 at a generally midway point along the length, L, of the blower 100 may enhance balance without compromising airflow power. Moreover, placement of the fan 138 further away from the rear end 106 of the blower 100 may attenuate noise emissions and/or narrow the field of noise emissions.

Figure 5:
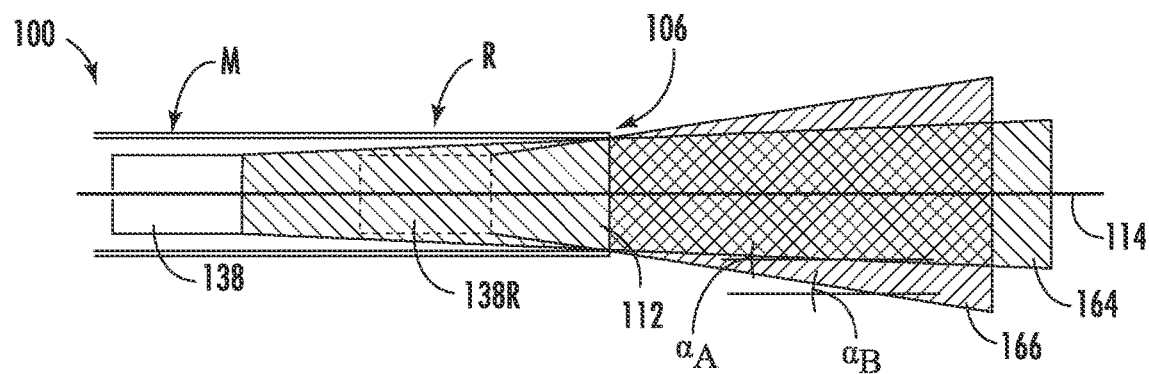
FIG. 5 includes a schematic, cross-sectional top view of a blower in accordance with an embodiment of the present disclosure.

FIG. 5 illustrates a schematic, cross-sectional top view of the blower 100 in accordance with an embodiment. FIG. 5 shows a fan 138 in accordance with embodiments described herein disposed near the midpoint M of the length of the blower 100. FIG. 5 also shows a rear positioned fan 138R disposed near a rear location R of the blower 100 as seen in traditional blowers. Noise emanating from blowers typically originates at noise generating elements like fan units disposed within the blower. The noise travels through the blower and exits through openings within the body. The shape of the opening, size of the opening, and/or relative spatial distance and location of the opening relative to the noise generating element can all affect the angular transmission of the noise within the external environment.

One primary opening in the blower 100 is the air inlet 112 at the rear end 106 of the blower 100. The air inlet 112 is one of the largest openings between the fan 138 and the external environment. Noise 164 generated by the fan 138 can pass through the air inlet 112 and disperse radially from the axis 114 by a radial factor, $RF_F$, as measured by a radial component of an angular offset, $\alpha_B$, of the noise 164 relative to the axis 114. Noise 166 generated by the rear positioned fan 138R of traditional blowers can similarly pass through the air inlet 112 and disperse radially from the axis 114. The radial factor, $RF_{FR}$, of the rear fan 138R, as measured by the radial component of an angular offset, $\alpha_B$, of the noise 166 relative to the axis 114, can be different from $RF_F$. More particularly, $RF_{FR}$ can be greater than $RF_F$. For instance, in an embodiment, $RF_{FR}$ is at least 1.01 $RF_F$, at least 1.05 $RF_F$, at least 1.1 $RF_F$, or at least 1.25 $RF_F$. As such, the radial dispersion of sound from traditional blowers with rear positioned fans 138R transmits from the blower 100 along a wider angular range as compared to fans 138 of blowers 100 in accordance with embodiments described herein. In an embodiment, the angular range of noise 164 generated by blowers 100 in accordance with embodiments described herein can be at least 1° less than an angular range of noise 166 generated by traditional blowers with rear positioned fans 138R, such as at least 2° less than the angular range of noise 166, such as at least 3° less than the angular range of noise 166, such as at least 4° less than the angular range of noise 166, such as at least 5° less than the angular range of noise 166, such as at least 10° less than the angular range of noise 166.

Referring again to FIG. 4, n an embodiment, the fan 138 can be disposed downstream of the handle 116, such as downstream of the opening 120 associated with the handle 116. By way of example, the fan 138 can be spaced apart from the handle 116, as measured along the axis 114, by at least 0.01 L, such as by at least 0.02 L, such as by at least 0.03 L, such as by at least 0.04 L, such as by 0.05 L, such as by at least 0.06 L, such as by at least 0.07 L, such as by at least 0.08 L. Placement of the fan 138 downstream of the handle 116 can distribute weight of the blower 100 such that the operator can exert less force on the blower 100 to maintain a downward sloped blowing angle, suitable for many outdoor applications like leaf management, yard maintenance, etc.

In an embodiment, the battery port 124 can be spaced apart from the fan 138 by at least 0.25 L, as measured along the axis 114, such as at least 0.3 L, such as at least 0.35 L, such as at least 0.4 L. Since the weight of the fan and motor 138 and 144 assembly and battery B constitute a large portion of the total weight of the blower 100, it is believed that spacing the two assemblies apart from one another may stabilize the blower 100 and create desirable weight distribution during operation.

In an embodiment, placement of the fan 138 entirely downstream of the handle 116 and the battery port 124 between the handle 116 and rear end 106 of the blower 100 can better distribute weight of the blower 100 to maintain a downward sloped blowing angle. Moreover, after removing the battery from the battery port 124, the blower 100 may be forward weighted, permitting an operator to more easily store the blower in a vertical, upright orientation.

The motor 144 can be spaced apart from the rear end 106 of the blower 100 by a distance greater than a distance between the rear end 106 of the blower 100 and the blades 142. By way of example, the motor 144 can be spaced apart from the rear end 106 of the blower 100 by at least 0.5 L, such as by at least 0.55 L, such as by at least 0.6 L, such as by at least 0.65 L, such as by at least 0.7 L, such as by at least 0.75 L, such as by at least 0.8 L, such as by at least 0.85 L. In an embodiment, the motor 144 is disposed closer to the front end 104 of the blower 100 than the rear end 106. Placement of the motor 144 and/or fan 138 at, or near, the center point of the blower 100 can distribute weight of the blower 100 such that the operator can exert less force on the blower 100 to maintain a downward sloped blowing angle.

Referring still to FIG. 4, the battery port 124 can define a shadow 148, as measured by a volume extending perpendicular to an area defined by the battery interface 128 toward the axis 114 of the blower 100. For example, the shadow 148 can be defined by a volume extending perpendicular to an area defined between a first axial end 150 of the battery port 124, a second axial end 152 of the battery port 124 and opposing lateral sides of the battery port 124. The shadow 148 of the battery port 124 can intersect the axis 114 of the blower 100 at a location between the front and rear ends 104 and 106. In an embodiment, the shadow 148 of the battery port 124 can intersect the axis 114 at a location between the rear end 106 of the blower 100 and the fan 138. In a more particular embodiment, the shadow 148 of the battery port 124 can intersect the axis 114 at a location between the rear end 106 and the blades 142 of the fan 138. In an embodiment, the shadow 148 can be spaced apart from a nearest portion of the fan 138 by at least 0.01 L, such as by at least 0.02 L, such as by at least 0.03 L, such as by at least 0.04 L, such as by at least 0.05 L.

In one or more embodiments, the shadow 148 of the battery port 124 can be spaced apart from the fan 138 and the plane 130 of the battery port 124 can be disposed at an angle, a, in a range of 1° and 89°, such as 10° and 80°, such as 30° and 60°, such as 35° and 55°, such as 40° and 50°. Embodiments where the shadow 148 of the battery port 124 is spaced apart from the fan 138 and the plane 130 of the battery port 124 is disposed at an angle offset from the axis 114 may exhibit desirable weight distribution characteristics.

Figure 6:
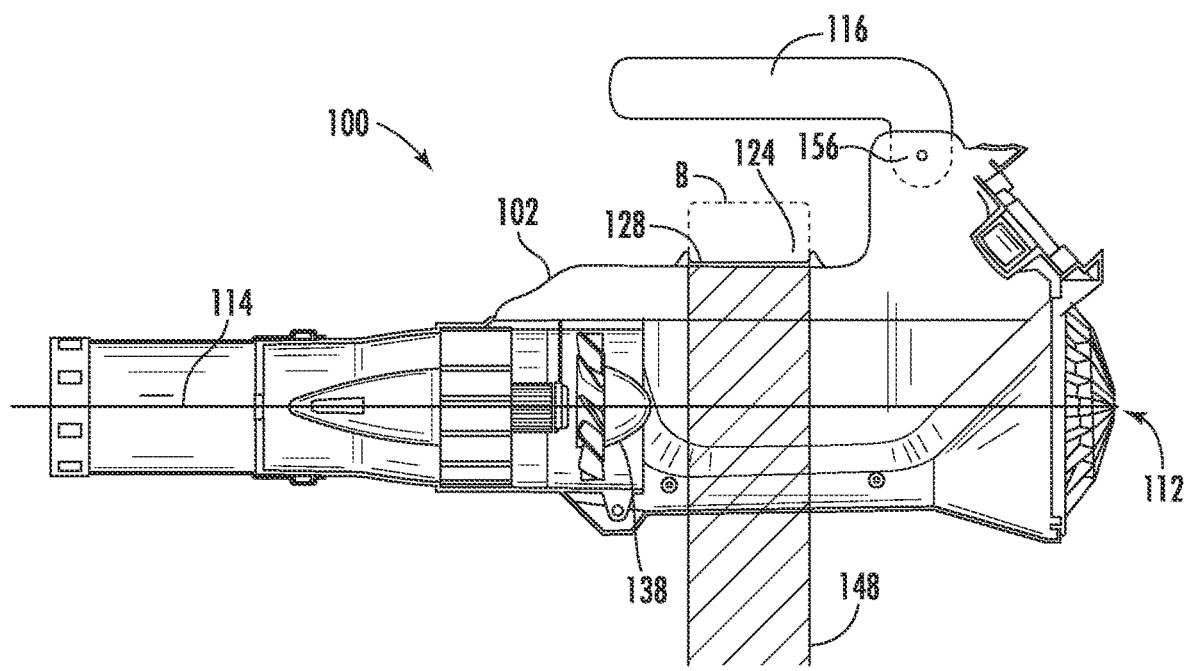
FIG. 6 includes a cross-sectional side view of a blower in accordance with an embodiment of the present disclosure.

Referring to FIG. 6, in an embodiment, the handle 116 can be coupled to the body 102 of the blower 100 at a single location. For instance, the handle 116 can include a generally L-shaped design coupled to the body 102 at only one end thereof. In a particular embodiment, the handle 116 can extend from the body 102 in a direction generally away from the air inlet 112. A leading end of the handle 116 can be spaced apart from the body 102.

In certain instances, the handle 116 can be coupled to the body 102 through an adjustable interface 156. By way of non-limiting example, the adjustable interface 156 can include a selectively lockable hinge. The adjustable interface 156 can be selectively locked at a plurality of discrete angles associated with different rotational positions of the handle 116. In one or more embodiments, the handle 116 can be selectively positioned at two or more rotational positions, such as at least three rotational positions, such as at least four rotational positions, such as at least five rotational positions. The handle 116 may be rotatable in a range of 1° and 180°, such as in a range of 5° and 135°, such as in a range of 30° and 90°. In an embodiment, the rotational axis can be perpendicular to the axis 114 of the blower 100. In another embodiment, the handle 116 can be fixed, i.e., not adjustable.

In the illustrated embodiment, the battery port 124 is disposed in front of the trailing end 158 of the handle 116.

The battery port 124 can define a battery interface 128 disposed along a plane generally parallel with the axis 114 of the blower 100. In one or more embodiments, the battery interface 128 of the illustrated battery port 124 can define a shadow 148 extending through the blower 100 in an area entirely behind the fan 138, e.g., on an upstream side of the fan 138 between the fan 138 and the air inlet 112. That is, the battery port 124 can be disposed behind the fan 138. Without wishing to be bound by any particular theory, it is believed that a battery port 124 disposed upstream of the fan 138, i.e., behind the fan 138, may result in reduction of noise generated by the blower 100, better balance the blower for a desirable weight distribution characteristic, or both. In certain instances, the shadow 148 can be spaced apart from a nearest portion of the fan 138 by at least 1 millimeter (mm), such as at least 2 mm, such as at least 5 mm, such as at least 10 mm, such as at least 20 mm, such as at least 50 mm.

Referring to FIG. 7, in an embodiment, the blower 100 can define a sound dampening material 160 disposed on an upstream side of the fan 138. In an embodiment, the sound dampening material 160 can be disposed between the fan 138 and the air inlet 112. In a more particular embodiment, the sound dampening material 160 extend an entire distance between the fan 138 and the air inlet 112. The sound dampening material 160 can define a channel for airflow through the blower 100. In an embodiment, the sound dampening material 160 can define an entire peripheral sidewall of the airflow channel. In an embodiment, the sound dampening material can also be included on a downstream side of the fan 138. The downstream side sound dampening material can have a same, or similar, shape, size, and/or material characteristic or property as compared to the upstream sound dampening material 160 previously described. In an embodiment, the sound dampening material 160 can include a material configured to reduce noise of the fan 138, e.g., decibels of the fan 138. Exemplary sound dampening materials include foam, fiber-based composites and/or other materials, such as glass-fiber or natural-fiber (such as jute) based composite or other material. In exemplary embodiments, the dampening material may be an open cell material, such as an open cell foam. For example, the dampening material may be formed form a polyurethane foam, such as in exemplary embodiments, an open cell polyurethane. In exemplary embodiments, the dampening material can have a thickness of between 1 mm and 30 mm, such as between 5 mm and 15 mm, such as between 7 mm and 10 mm. In a particular embodiment, the dampening material can have a thickness of approximately 8 mm.

In an embodiment, the sound dampening material 160 can include a reinforcing structure (not illustrated). In one or more embodiments, the reinforcing structure can be at least partially embedded within the sound dampening material 160. In other embodiments, the reinforcing structure can be disposed adjacent to a surface of the sound dampening material 160, e.g., an inner surface and/or an outer surface thereof.

Blowers in accordance with embodiments described herein can exhibit weight distributions that permit an operator to easily maintain a downward sloped blowing angle. Such downward sloped angles may be particularly advantageous when the operator desires to blow leaves, mulch, debris, and other ground-level objects. Natural downward sloped blowing angles can reduce impact on the operator's wrists, arms, and back while allowing smaller operators to handle larger blowers for longer durations of time without requiring rest.

In one or more embodiments described herein, the blower can have a center of gravity located in front of the handle, i.e., downstream of the handle. In a particular embodiment, the center of gravity can be adjacent to a front edge of the gripping surface of the handle, i.e., just downstream of the trigger. Thus, when the operator grips the handle, the blower naturally maintains a downward sloped blowing angle. Inclusion of a rear mounted battery may increase rotational inertia of the blower, thereby reducing resultant forces experienced by the operator during use and allowing smaller operators to handle larger blowers for longer durations of time without requiring rest.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blower comprising:
a body having a length, L, as measured between front and rear ends of the blower in a direction of airflow through the blower, wherein the front end is defined by an exhaust port of an airflow outlet tube, and wherein the rear end is defined by an air inlet;
a fan including a plurality of blades configured to generate airflow through the blower, wherein the blades are spaced apart from the rear end of the blower by at least 0.4 L; and
a battery port comprising a battery interface configured to receive a battery,
wherein the battery interface defines a shadow, as measured by a volume extending perpendicular to an area defined by the batters interface towards a longitudinal axis of the blower, and
wherein the entire shadow intersects the longitudinal axis of the blower at a location between the air inlet and the fan.

2. The blower of claim 1, wherein the fan is rotatably biased by a motor spaced apart from the rear end of the blower by at least 0.5 L.

3. The blower of claim 1, wherein at least 75% of the fan is disposed within the airflow outlet tube of the blower.

4. The blower of claim 1, wherein the fan is disposed downstream of the handle, and wherein the fan is spaced apart from the handle by at least 0.08 L, as measured in the direction of airflow.

5. The blower of claim 1, wherein the rear end is defined by an air inlet, and wherein the air inlet is substantially coaxial with the airflow outlet tube.

6. The blower of claim 1, wherein the battery port is spaced apart from the fan by at least 0.25 L in the direction of airflow through the blower.

7. The blower of claim 6, wherein the entire battery port is disposed between the front and rear ends of the blower, and wherein at least a portion of the battery extends from the battery port to a location beyond the rear end of the blower when the battery is engaged with the battery port.

8. The blower of claim 6, wherein the battery interface lies along a plane or best fit plane disposed at an orientation between 35° and 55°, as measured with respect to the direction of airflow.

9. The blower of claim 8, wherein the plane or best fit plane intersects the longitudinal axis of the blower at an intersecting location, and wherein the rear end of the blower is disposed between the front end of the blower and the intersecting location.

10. The blower of claim 1, wherein the fan is driven by a motor, and wherein the handle is coupled to the body at a location between the motor and the rear end of the blower.

11. A blower comprising:
a fan;
a body comprising:
  a front end defined by an exhaust port of an airflow outlet tube;
  a rear end defined by an air inlet; and
  a handle disposed between the air inlet and the fan; and
a battery port,
wherein the battery port comprises a battery interface disposed between the air inlet and the handle,
wherein the battery interface lies along a plane or best fit plane that intersects a longitudinal axis of the blower at an intersecting location,
wherein the rear end of the blower is disposed between the front end of the blower and the intersecting location,
wherein at least a portion of a battery receivable in the battery port extends from the battery interface to a location beyond the rear end of the body, and
wherein an entire shadow of the battery interface, as measured by a volume extending perpendicular to an area defined by the battery interface towards the longitudinal axis of the blower, intersects the longitudinal axis of the blower at a location between the air inlet and the fan.

12. The blower of claim 11, wherein the plane or best fit plane is disposed at an orientation of approximately 45°, as measured with respect to the direction of airflow.

13. The blower of claim 11, wherein the plane or best fit plane is disposed at an orientation between 35° and 55°, as measured with respect to the direction of airflow through the blower.

14. The blower of claim 11, wherein the fan is driven by a motor, and wherein the handle is coupled to the body at a location between the motor and the rear end of the blower.

15. The blower of claim 1, wherein at least a portion of the battery received at the battery interface extends from the battery interface to a location beyond the rear end of the body.

16. The blower of claim 11, wherein the body defines a length, L, as measured between the rear end and a front end of the blower, and wherein at least a portion of the fan is spaced apart from the rear end of the blower by at least 0.4 L.

17. The blower of claim 11, wherein the fan is disposed downstream of the handle, and wherein the fan is spaced apart from the handle by at least 0.08 L, as measured in the direction of airflow.

18. The blower of claim 11, wherein the air inlet is coaxial with the direction of airflow through the blower.

19. A blower comprising:
a fan;
an air inlet defining a rear end of the blower;
a handle; and
a battery port comprising a battery interface configured to receive a battery,
wherein the battery interface defines a shadow, as measured by a volume extending perpendicular to an area defined by the battery interface towards a longitudinal axis of the blower, and
wherein the entire shadow intersects the longitudinal axis of the blower at a location between the air inlet and the fan.

20. The blower of claim 19, wherein the battery interface defines a plane or best fit plane disposed at an orientation between 35° and 55°, as measured with respect to a direction of airflow through the blower.

* * * * *